June 1, 1926. 1,586,974
J. P. DEVLIN
FLOUR SIFTER
Filed Dec. 14, 1925
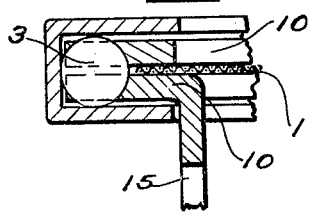
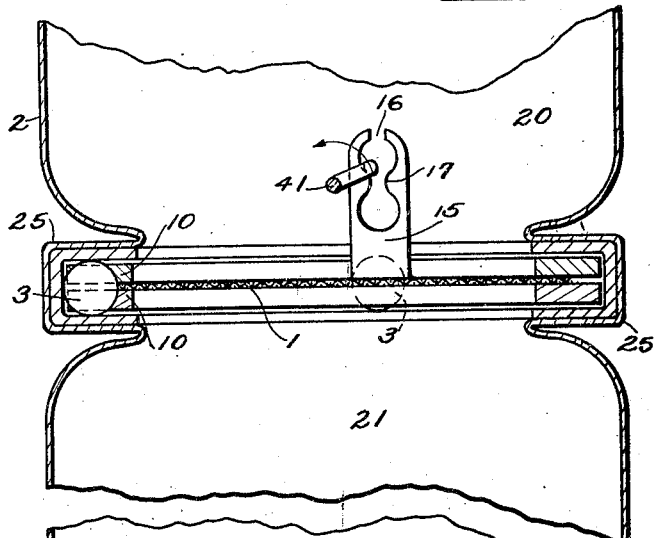
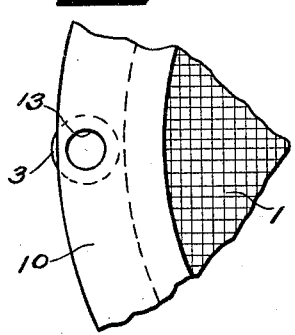
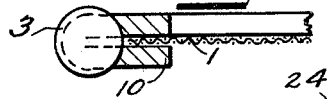
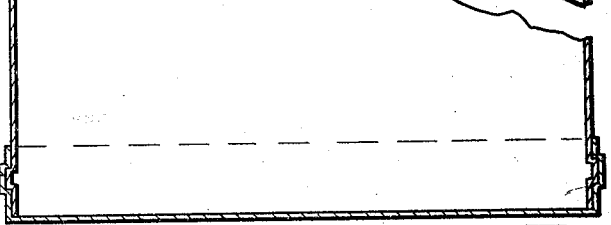
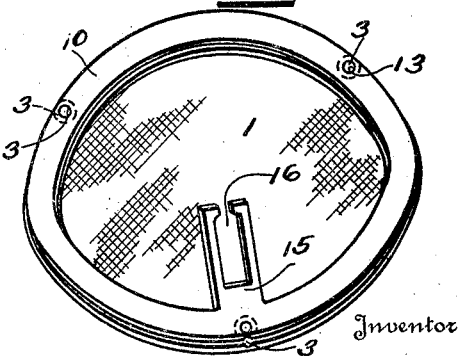
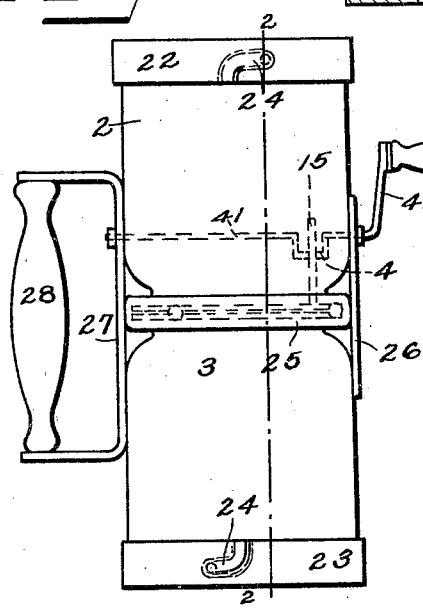
Inventor
Joseph P. Devlin
By N. L. & C. L. Reynolds
Attorneys

Patented June 1, 1926.　　　　　　　　　　　　　　　　　　　　　　1,586,974

UNITED STATES PATENT OFFICE.

JOSEPH P. DEVLIN, OF SEATTLE, WASHINGTON.

FLOUR SIFTER.

Application filed December 14, 1925. Serial No. 75,240.

My invention relates to flour sifters, and especially to the mounting and the means for manipulating the screen of a sifter, whether employed in the ordinary domestic sifter or incorporated within a cabinet type sifter.

One of the objects of my invention is to mount the screen in such a way that the flour, and any other ingredients which may be mixed therewith, will be thoroughly sifted and lightened by a succession of rapid oscillatory movements, preferably separated by periods of rest.

A further object is a provision for mounting such a screen which will permit movement of the screen with slight effort yet which is not liable to become clogged with flour.

A further object is the provision of mechanism for operating the screen so positioned as to leave the central portion of the screen clear of operating parts to the end that they may not catch and retard the flour.

Further objects may be ascertained by a study of this specification and the claims.

My invention comprises the novel parts and combinations thereof which are shown in the accompanying drawings, described in the specification, and particularly defined by the claims terminating the same.

In the accompanying drawings I have shown my invention in forms which are now preferred by me.

Figure 1 is an elevation of a complete sifter constructed according to my invention.

Figure 2 is an axial sectional view through the sifter, taken on line 2—2 of Figure 1.

Figure 3 is a perspective view of the screen and connected parts, illustrating a slight modification.

Figure 4 is a detail section on line 4—4 of Figure 2, illustrating one of the bearing balls and the screen mounting.

Figure 5 is an elevation of the screen and ball mounting.

Figure 6 is a view similar to Figure 4, showing a slight modification.

It is recongnized by domestic science experts that the sifting of flour for fine baking it not for the purpose of removing lumps, but for the purpose of insuring that each grain of the flour is separate and free of all of the others so that the flour may be light. The use of scrapers passing over a screen does not greatly assist in obtaining the desired result, as these scrapers act chiefly to press flour through the screen. It is highly desirable to cause relative motion between the flour and the screen so that flour will be broken into small particles as it passes through the screen, these particles being separated from the main body of the flour. To obtain the best results, a series of rapid, quickly recurring motions, either of the screen relative to the flour or of the flour relative to the screen, is desirable. To attain this end, therefore, I have provided a screen 1 so mounted within a casing 2 that rapid to and fro or oscillatory movements of the screen are permitted. The casing is provided with an upper compartment 20 and a lower compartment 21 with the screen 1 interposed between the two. By providing these compartments with caps 22 and 23, respectively (which caps may be secured in place by the bayonet joints indicated at 24, or by other suitable means), the flour can be sifted from the compartment 20 into the compartment 21 and then back into compartment 20, and so passed through the screen 1 as many times as may be desirable to lighten the flour.

The screen is illustrated as secured between the two peripheral rings 10 which clamp its edges; these rings 10 may be secured together by riveting, by spot-welding, or by any other suitable means. In Figure 6 the ring is shown as formed of a single ring bent upon itself to include the edge of screen 1 between its folds. To permit easy movement of the screen I have shown balls 3 disposed about the periphery of rings 10 and held therein in such manner that they may not be lost, but so that they will protrude just sufficiently to bear upon an annular race 31, which is U-shaped in cross-section, and to prevent contact of the screen or rings 10 thereupon. To hold the balls in place the rings 10 are shown as having part-circular indentations 13, the top indentations in the top and bottom rings coinciding. By reason of the fact that the diameter of the indentations is less than the diameter of the balls 3 and because the opposite points 14 of the indentations extend outwardly of the center of balls 3, the balls will be retained and will not readily be removed from their place between the two rings.

One of the rings 10 is provided with an up-standing lug 15 which has a slot 16 for the reception of the crank 4 formed in a shaft or rod 41 journaled in the casing 2, and preferably extending from side to side of one of the chambers as 20. By providing a crank handle 42 outside of the casing the crank 4 may be rotated by engagement with the sides of the slot 16, and thus the lug 15, and consequently the ring 10 and screen 1 to which the lug is secured, is oscillated from side to side. In Figure 3 the slot 16 has been shown as larger than the crank 4. This causes the crank to engage the sides of the slot only during a part of its revolution but insures the engagement of each side of the slot when the crank is moving rapidly, thus giving the screen an initial jerk or kick which greatly assists in the screening action. In the preferred form shown in Figure 2 however, the effect is altered somewhat through the provision of cam-like humps 17 intermediate the ends of the slot 16, whereby the crank 4, as it moves upward or downward over the sides of the slot, gives an accelerating movement to the screen just prior to leaving this side of the slot and engaging the opposite side. The slot in this form remains larger than the diameter of the crank 4, hence the kicking effect previously described still obtains. This also causes the screen to be moved through the full throw of the crank 4.

The device is assembled with the screen 1, the peripheral rings 10 the balls 3 and the race 31 forming a unit. This unit is then crimped into the casing 2 as indicated at 25 or is otherwise suitably secured in place. It is desirable to crimp to or beyond the inner edge of the race 31, so that flour is directed upon the screen, and is not likely to enter the race itself. This may form a comparatively deep crimp, which may be suitably reinforced if necessary. The crank 4 is then positioned in engagement with the slot 16, the ends of the rod 41 being journaled in opposite sides of the casing. If desired a reinforcing bar 26 may receive one end of the rod 41 and may connect the two halves of the casing to reinforce the crimp at 25, and a similar function is performed at the opposite side by the bar 27, forming a bracket within which a handle 28 is supported. The device is then ready for use in the ordinary manner by rotating the crank handle 42, and this movement causes a rapid oscillation of the screen 1 in the manner described.

What I claim as my invention is:

1. In a flour sifter, a substantially circular screen, bearing balls secured in position about the edge of said screen, an annular ball race U-shaped in cross-section enclosing said balls and the edge of the screen, a cylindrical casing surrounding said race, and crimped thereabout between its ends to form two chambers separated by the screen, and means for moving said screen relative to said ball-race and casing.

2. In a flour sifter, a substantially circular screen, bearing balls secured in position about the edge of said screen, an annular ball race U-shaped in cross-section enclosing said balls and the edge of the screen, a cylindrical casing surrounding said race, and crimped thereabout between its ends to form two chambers separated by the screen, a slotted lug upstanding from an edge of the screen and extending into one of said chambers, a crank journaled in said casing and operatively engaged with the slot in said lug, and means without the casing for rotating said crank, thereby to oscillate the screen relative to the ball race and casing.

3. In a flour sifter, a substantially circular screen, bearing balls secured in position about the edge of said screen, an annular ball race U-shaped in cross-section enclosing said balls and the edge of the screen, a cylindrical casing surrounding said race, and crimped thereabout between its ends to form two chambers separated by the screen, a slotted lug upstanding from an edge of the screen and extending into one of said chambers, a crank journaled in said casing and operatively engaged with the slot in said lug, said crank being of less diameter than the length of said slot.

4. In a flour sifter, a substantially circular screen, bearing balls secured in position about the edge of said screen, an annular ball race U-shaped in cross-section enclosing said balls and the edge of the screen, a cylindrical casing surrounding said race, and crimped thereabout between its ends to form two chambers separated by the screen, an external U-shaped bracket connecting parts of the casing at opposite sides of the screen, a handle supported in said bracket, a bar disposed at the opposite side of the casing from said bracket, and likewise connecting parts of the casing at opposite sides of the screen, a crank shaft extending across one of said chambers and journaled in said bracket and bar, and a slotted lug upstanding from an edge of said screen and extending in that chamber wherein is the crank shaft, the crank on said shaft engaging within the slot of said lug, whereby rotation of the crank causes oscillatory movement of the screen relative to said race and casing.

Signed at Seattle, King County, Washington, this 19th day of November, 1925.

JOSEPH P. DEVLIN.